US005972481A

United States Patent [19]

Stein et al.

[11] Patent Number: 5,972,481

[45] Date of Patent: *Oct. 26, 1999

[54] HEAT-TRANSFER LABEL

[75] Inventors: Samuel H. Stein, Westborough, Mass.; Jean Paul Laprade, North Smithfield, R.I.

[73] Assignee: Avery Dennison Corporation, Pasadena, Calif.

[ * ] Notice: This patent is subject to a terminal disclaimer.

[21] Appl. No.: 08/960,984

[22] Filed: Oct. 30, 1997

Related U.S. Application Data

[63] Continuation-in-part of application No. 08/625,013, Mar. 29, 1996, Pat. No. 5,766,731, and a continuation-in-part of application No. 08/918,903, Aug. 27, 1997.

[51] Int. Cl.$^{6}$ ........ B32B 3/00

[52] U.S. Cl. ........ 428/195; 428/40.1; 428/352; 428/347; 428/349; 428/204; 428/411.1

[58] Field of Search ........ 428/195, 352, 428/40.1, 347, 349, 204, 411.1

[56] References Cited

U.S. PATENT DOCUMENTS

| | | | |
|---|---|---|---|
| 4,426,422 | 1/1984 | Daniels | 428/352 |
| 4,935,300 | 6/1990 | Parker et al. | 428/352 |
| 5,766,731 | 6/1998 | Stein et al. | 428/195 |

OTHER PUBLICATIONS

Technical literature, UNITHOX 750 ethoxylated alcohols, Petrolite Corporation, Tulsa, Oklahoma (1988).

Technical literature, VERSAMID 930 polyamide resin, Henkel Corporation Minneapolis, MN, published before the filing of the present application.

*Primary Examiner*—William Krynski
*Assistant Examiner*—Hong J. Xu
*Attorney, Agent, or Firm*—Kriegsman & Kriegsman

[57] ABSTRACT

A heat-transfer label that is well-suited for use on styrene-acrylonitrile surfaces. In one embodiment, the label includes a support portion, the support portion comprising a polyethylene-coated paper carrier web. The label also includes a waxlike skim coat overcoated on the support portion. The label further comprises a transfer portion printed on top of the skim coat, the transfer portion including a protective lacquer layer, an ink layer and an adhesive layer. The protective lacquer layer is printed onto the skim coat and comprises nitrocellulose, a release agent, a low molecular weight methyl/n-butyl methacrylate copolymer and a medium molecular weight methyl methacrylate copolymer. The ink layer, which comprises one or more polyamide inks and/or acrylic inks, is printed onto the protective lacquer layer. The adhesive layer is printed over the ink layer, as well as over any exposed portions of the lacquer layer and a surrounding portion of the skim coat and comprises a high molecular weight isobutyl methacrylate, a chlorinated polypropylene resin and glyceryl tribenzoate.

24 Claims, 1 Drawing Sheet

HEAT-TRANSFER LABEL

CROSS-REFERENCE TO RELATED APPLICATIONS

The present application is a continuation-in-part of U.S. patent application Ser. No. 08/625,013, filed Mar. 29, 1996, now U.S. Pat. No. 5,766,731 and a continuation-in-part of U.S. patent application Ser. No. 08/918,903, filed Aug. 27, 1997. Both of the aforementioned patent applications are incorporated herein by reference.

BACKGROUND OF THE INVENTION

The present invention relates generally to heat-transfer labels and more specifically to a heat-transfer label possessing particular resistance to pinholing.

Heat-transfer labels are commonly used in the decorating and/or labelling of commercial articles, such as, and without limitation to, containers for beverages, essential oils, detergents, adverse chemicals, and health and beauty aids, as well as flat surfaces. As can readily be appreciated, heat-transfer labels are desirably resistant to abrasion and chemical effects in order to avoid a loss of label information and desirably possess good adhesion to the articles to which they are affixed.

One well-known type of heat-transfer label is described in U.S. Pat. No. 3,616,015, inventor Kingston, which issued October, 1971, and which is incorporated herein by reference. In the aforementioned patent, there is disclosed a heat-transfer label comprising a paper sheet or web, a wax release layer affixed to the paper sheet, and an ink design layer printed on the wax release layer. In the heat-transfer labelling process, the label-carrying web is subjected to heat, and the label is pressed onto an article with the ink design layer making direct contact with the article. As the paper sheet is subjected to heat, the wax layer begins to melt so that the paper sheet can be released from the ink design layer, a portion of the wax layer being transferred with the ink design layer and a portion of the wax layer remaining with the paper sheet. After transfer of the design to the article, the paper sheet is immediately removed, leaving the design firmly affixed to the article and the wax transferred therewith exposed to the environment. The wax layer is thus intended to serve two purposes: (1) to provide release of the ink design from the web upon application of heat to the web and (2) to form a protective layer over the transferred ink design. After transfer of the label to the article, the transferred wax release layer is typically subjected to a post-flaming technique which enhances the optical clarity of the wax protective layer (thereby enabling the ink design layer therebeneath to be better observed) and which enhances the protective properties of the transferred wax release.

In some heat-transfer labels, an adhesive layer (e.g., solvent-soluble polyamide, acrylic or polyester) is deposited over the ink design to facilitate adhesion of the label onto a receiving article. An example of a heat-transfer label having an adhesive layer is disclosed in U.S. Pat. No. 4,548,857, inventor Galante, which issued Oct. 22, 1985, and which is incorporated herein by reference. Additionally, in some heat-transfer labels, a protective lacquer layer is interposed between the wax release layer and the ink layer. An example of such a label is disclosed in U.S. Pat. No. 4,426,422, inventor Daniels, which issued Jan. 17, 1984, and which is incorporated herein by reference.

One phenomenon that has been noted with heat-transfer labels of the type described above containing a wax release layer is that, quite often, a degree of hazing or a "halo" is noticeable over the transferred label when the transfer is made onto clear materials. This "halo" effect, which persists despite post-flaming and which may detract from the appearance of the label, is a result of the nature of the wax coating around the outer borders of the transferred ink design layer. Hazing due to the wax release layer may also appear in "open-copy" areas of the label, i.e., areas of the label where no ink is present between the adhesive and protective lacquer layers, and also may detract from the appearance of the label.

In addition to and related to the aforementioned problem of hazing, when heat-transfer labels of the type described above are applied to dark-colored containers, the outer wax layer of the label often appears as a whitish coating on the container, which effect is undesirable in many instances. Furthermore, scratches and similar abrasions to the outer wax layer of the label can occur easily and are readily detectable.

Accordingly, to address the aforementioned issues, considerable effort has been expended in replacing or obviating the need for a wax release layer. One such wax-less, heat-transfer label is disclosed in U.S. Pat. No. 3,922,435, inventor Asnes, which issued Nov. 25, 1975. In the aforementioned patent, the layer of wax is replaced with a layer of a non-wax resin. This non-wax resinous layer is referred to in the patent as a dry release since it does not transfer to the article along with the ink design layer. In a preferred embodiment of the patent, the non-wax resinous layer comprises a thermoset polymeric resin, such as cross-linked resins selected from the group consisting of acrylic resins, polyamide resins, polyester resins, vinyl resins and epoxy resins.

Another example of a wax-less, heat-transfer label is disclosed in U.S. Pat. No. 4,935,300, inventors Parker et al., which issued Jun. 19, 1990, and which is incorporated herein by reference. In the aforementioned patent, the label, which is said to be particularly well-suited for use on high density polyethylene, polypropylene, polystyrene, polyvinylchloride and polyethylene terephthalate surfaces or containers, comprises a paper carrier web which is overcoated with a layer of polyethylene. A protective lacquer layer comprising a polyester resin and a relatively small amount of a non-drying oil is printed onto the polyethylene layer. An ink design layer comprising a resinous binder base selected from the group consisting of polyvinylchloride, acrylics, polyamides and nitrocellulose is then printed onto the protective lacquer layer. A heat-activatable adhesive layer comprising a thermoplastic polyamide adhesive is then printed onto the ink design layer.

Although the above-described wax-less, heat-transfer label substantially reduces the wax-related effects discussed previously, said label does not quite possess the same release characteristics of heat-transfer labels containing a wax release layer. Accordingly, another type of heat-transfer label differs from the heat-transfer label disclosed in U.S. Pat. No. 4,935,300, only in that a very thin layer or "skim coat" of a waxlike material is interposed between the polyethylene release layer and the protective lacquer layer to improve the release of the protective lacquer from the polyethylene-coated carrier web. The thickness of the skim coat corresponds to approximately 0.1–0.4 lbs. of the wax-like material spread onto about 3000 square feet of the polyethylene release layer An example of the aforementioned type of heat-transfer label, which has been manufactured and used by the assignee of the present application to label polypropylene bottle caps, comprises a paper carrier web overcoated with a layer of polyethylene. A skim coat is overcoated on the polyethylene layer. A protective lacquer layer comprising vinyl and polyester resins is printed on the skim coat. An ink design layer comprising vinyl and polyester resins is printed on the protective lacquer layer. A heat-activatable adhesive layer comprising an acrylic resin, a chlorinated polyolefin and a plasticizer is printed over the ink design layer. The acrylic resin of the adhesive layer is a butyl methacrylate resin, such as ELVACITE® 2045, which is commercially available from ICI Acrylics Inc. (Wilmington, Del.). The chlorinated polyolefin of the adhesive layer is a chlorinated polypropylene commercially available from Eastman Chemical Products, Inc. (Kingsport, Tenn.) as chlorinated polyolefin CP-343-1. The plasticizer is a glyceryl tribenzoate, such as BENZOFLEX® S-404, which is commercially available from Velsicol Chemical Corporation (Chicago, Ill.).

Another type of heat-transfer label made and used by the assignee of the present application, which label has been used to decorate a polypropylene container, comprises a paper carrier web overcoated with a layer of polyethylene. A protective lacquer layer comprising a methyl methacrylate resin (ELVACITE® 2041—commercially available from ICI Acrylics Inc.), an ethyl methacrylate resin (ELVACITE® 2042 - commercially available from ICI Acrylics Inc.), cellulose acetate butyrate and a plasticizer is printed on the polyethylene layer. An ink design layer comprising a polyamide ink is printed on the protective lacquer layer. A heat-activatable adhesive layer comprising an acrylic resin is printed on the ink design layer.

In commonly-assigned U.S. patent application Ser. No. 08/625,013, there is disclosed a heat-transfer label which was used in the United States prior to one year before the filing of the present application to label styrene-acrylonitrile (SAN) containers. Said heat-transfer label comprises a paper carrier web overcoated with a layer of polyethylene. A waxlike skim coat is overcoated on the polyethylene layer. A protective lacquer layer comprising ELVACITE® 2013 methyl/n-butyl methacrylate copolymer (ICI Acrylics Inc., Wilmington, Del.) and ELVACITE® 2014 methyl methacrylate copolymer (ICI Acrylics Inc., Wilmington, Del.) in a 3:2 ratio, respectively, by weight, is printed onto the skim coat. An ink layer comprising a polyamide ink and/or an acrylic ink is printed onto the protective lacquer layer. An adhesive layer comprising about 65%, by weight, of ELVACITE® 2045 butyl methacrylate resin, about 30%, by weight, of CP-343-1 chlorinated polyolefin (Eastman Chemical Products, Inc., Kingsport, Tenn.), and about 5%, by weight, of BENZOFLEX® S-404 glyceryl tribenzoate is printed onto the ink layer, as well as being printed onto any exposed portions of the protective lacquer layer and onto a surrounding area of the skim coat.

One shortcoming that the present inventors have noted in connection with the use of the aforementioned heat-transfer label to decorate SAN containers is the common occurrence of "pinholing"—the formation of one or more "pinhole"-sized ruptures in the label. As can readily be appreciated, the occurrence of "pinholing" in a heat-transfer label is highly undesirable because it detracts from the physical integrity and appearance of the label and may lead to further degradation thereto. The present inventors have also detected "pinholing" in other types of heat-transfer labels.

SUMMARY OF THE INVENTION

It is an object of the present invention to provide a novel heat-transfer label.

It is another object of the present invention to provide a heat-transfer label that exhibits good resistance to "pinholing."

Additional objects, as well as features, advantages and aspects of the present invention, will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

According to one aspect of the invention, there is provided a heat-transfer label, said heat-transfer label comprising (a) a support portion; and (b) a transfer portion over said support portion for transfer of the transfer portion from the support portion to an article upon application of heat to the support portion while the transfer portion is placed into contact with the article, said transfer portion comprising (i) a protective lacquer layer, said protective lacquer layer comprising nitrocellulose, a release agent and at least one acrylic resin; (ii) an ink layer over said protective lacquer layer; and (iii) an adhesive layer over said ink layer.

Said release agent of said protective lacquer layer is preferably an ethoxylated alcohol, such as UNITHOX™ ethoxylated alcohol, said protective lacquer layer more preferably comprising nitrocellulose, UNITHOX™ ethoxylated alcohol, ELVACITE® 2013 methyl/n-butyl methacrylate copolymer and ELVACITE® 2014 methyl methacrylate copolymer, the aforementioned components most preferably being present in said protective lacquer layer in the following approximate amounts, by weight: 5%, 20%, 45% and 30%, respectively.

In a first preferred embodiment of the above-described heat-transfer label, which embodiment is particularly well-suited for use in decorating styrene-acrylonitrile surfaces, said heat-transfer label comprises (a) a support portion; (b) a transfer portion over said support portion for transfer of the transfer portion from the support portion to an article upon application of heat to the support portion while the transfer portion is placed into contact with the article, said transfer portion comprising (i) a protective lacquer layer of the type described above, (ii) an ink layer over said protective lacquer layer, said ink layer comprising a polyamide ink and/or an acrylic ink, and (iii) an adhesive layer over said ink layer, said adhesive layer comprising an acrylic resin and a chlorinated polypropylene resin; and (c) a wax-like skim coat interposed between said support portion and said transfer portion.

Said adhesive layer preferably comprises ELVACITE® 2045 butyl methacrylate resin, CP-343-1 chlorinated polypropylene (Eastman Chemical Products, Inc., Kingsport, Tenn.), and BENZOFLEX® S-404 glyceryl tribenzoate, the aforementioned components preferably being present in said adhesive layer in the following approximate amounts, by weight: 65%, 30% and 5%, respectively. Said polyamide ink preferably further includes nitrocellulose, and said support portion preferably is polyethylene-coated paper.

In a second preferred embodiment of the above-described heat-transfer label, which embodiment is particularly well-suited for use in decorating polyethylene terephthalate (PET) surfaces (especially non-refundable PET containers), said heat-transfer label comprises (a) a support portion; (b) a transfer portion over said support portion for transfer of the transfer portion from the support portion to an article upon application of heat to the support portion while the transfer portion is placed into contact with the article, said transfer portion comprising (i) a protective lacquer layer of the type described above, (ii) an ink layer over said protective lacquer layer, said ink layer comprising a polyamide ink, and (iii) an adhesive layer over said ink layer, said adhesive layer comprising nitrocellulose and a combination of at least two polyamide resins; and (c) a wax-like skim coat interposed between said support portion and said transfer portion.

Said polyamide ink preferably further includes nitrocellulose. Said adhesive layer preferably comprises nitrocellulose, a first polyamide resin of the type commercially available as VERSAMID® 930 and a second polyamide resin of the type commercially available as VERSAMID® 756, the aforementioned components more preferably being present in said adhesive layer in the following approximate amounts, by weight: 35%, 40% and 25%, respectively. Said support portion preferably is polyethylene-coated paper.

In addition to being directed to the above-described heat-transfer label, the present invention is also directed to the transfer portion of the heat-transfer label, as well as to the adhesive layer of the transfer portion, to an adhesive composition for forming the adhesive layer, to the protective lacquer layer of the transfer portion, to a composition for forming the protective lacquer layer, and to methods of labelling SAN and PET surfaces with the above-described heat-transfer labels.

For purposes of the present specification and claims, it is to be understood that certain terms used herein, such as "on" or "over," when used to denote the relative positions of two or more layers of a heat-transfer label, are primarily used to denote such relative positions in the context of how those layers are situated prior to transfer of the transfer portion of the label to an article since, after transfer, the arrangement of layers is inverted as those layers which were furthest removed from the associated support sheet are now closest to the labelled article.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts.

DETAILED DESCRIPTION OF PREFERRED EMBODIMENTS

Figure 1:
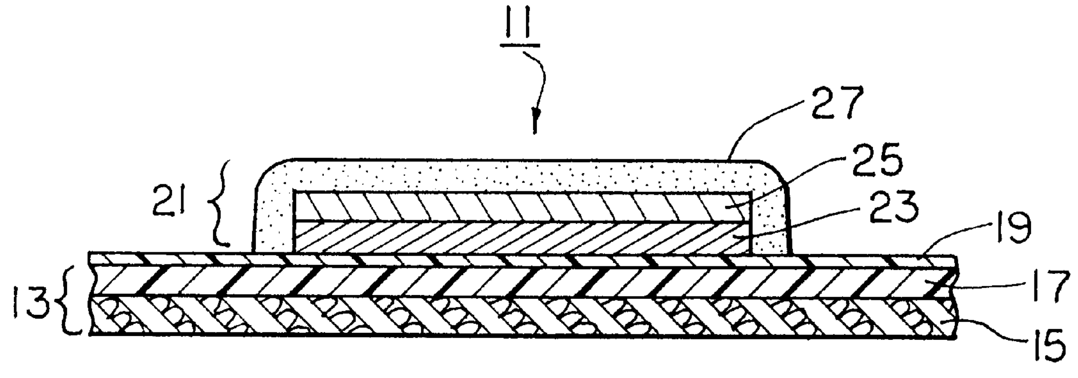
FIG. 1 is a schematic section view of a first embodiment of a heat-transfer label constructed according to the teachings of the present invention, said heat-transfer label being particularly well-suited for use on styrene-acrylonitrile (SAN) surfaces.

As noted above, the present inventors have observed that "pinholing" occurs commonly in connection with the heat-transfer labelling of certain articles. Without wishing to be limited to any particular theory as to how "pinholing" occurs, the present inventors believe that "pinholing" occurs when air becomes trapped between an article being decorated and the adhesive layer of a heat-transfer label applied thereto, and heat is thereafter applied to the thus-decorated article (for example, during post-flaming of the label or the like). Said heating causes the trapped air to expand and often leads to the rupturing of one or more of the constituent layers of the label. In those instances in which all of the constituent layers of the label positioned over the bubble rupture, the result is typically a pinhole-sized tear in the label.

The present inventors also believe, without wishing to be limited to any particular theory, that one reason why air commonly becomes trapped between an article and the adhesive layer of a heat-transfer label is that the transfer portion of the label does not always release uniformly from its associated support portion. Instead, some portions of the protective lacquer layer often have a tendency to stick to isolated areas of the support portion. (This sticking phenomenon is observed most frequently with certain label constructions of the type having a waxlike skim coat.) These isolated areas of the protective lacquer layer that do not release from the support portion, in turn, tend to pull the adhesive layer away from the article to be decorated, thereby allowing air to enter between the adhesive layer and the article.

Accordingly, the present inventors believe that one approach to minimizing the amount of air trapped between the adhesive layer and the article to be decorated is to improve the release of the protective lacquer layer from the support portion. This is achieved, as will hereinafter be explained in more detail, by adding a release agent, such as UNITHOX™ ethoxylated alcohol, to the protective lacquer layer. Other release agents, which may include a surfactant of the type commercially available as AEROSOL® OT-MSO dioctyl sodium sulfosuccinate in mineral seal oil (Cytec Industries, West Paterson, N.J.) or waxes, such as carnauba wax, may also be suitable.

The present inventors also believe that the amount of air trapped between the adhesive layer and the article to be decorated can be minimized by minimizing the peel angle, i.e., the angle at which the adhesive layer is applied to the article being decorated. This may be done, for example, by minimizing the diameter of the transfer roller used to apply the label to the article.

Furthermore, the present inventors believe that "pinholing" can further be minimized by providing a protective lacquer layer that is highly resistant to rupturing so that, even if air bubbles do form between the adhesive layer and the article to be decorated, such air bubbles will not cause the protective lacquer layer to be ruptured extensively, if at all. In accordance with the teachings of the present invention, such a protective lacquer layer comprises nitrocellulose and a combination of acrylic resins, such as ELVACITE® 2013 methyl/n-butyl methacrylate copolymer and ELVACITE® 2014 methyl methacrylate copolymer. Preferably, the aforementioned components are present in said protective lacquer layer in the following approximate amounts, by weight: 5% nitrocellulose, 45% ELVACITE® 2013 methylln-butyl methacrylate copolymer and 30% ELVACITE® 2014 methyl methacrylate copolymer, with the remainder being UNITHOX™ ethoxylated alcohol.

Referring now to FIG. 1, there is shown a schematic section view of a first embodiment of a heat-transfer label constructed according to the teachings of the present invention, said heat-transfer label being particularly well-suited for use on styrene-acrylonitrile surfaces and being represented generally by reference numeral 11.

Label 11 comprises a support portion 13. Support portion 13, in turn, preferably comprises a carrier web 15, which is typically paper or a similarly suitable substrate, and a nonwax release layer 17, which is overcoated onto carrier web 15. (In an alternative embodiment, carrier web 15 may be omitted from support portion 13.) Preferably, nonwax release layer 17 comprises a layer of polyethylene or a layer of polypropylene, with polyethylene being the more preferred material. Details of polyethylene layer 17 are disclosed in U.S. Pat. No. 4,935,300, discussed above, and in U.S. Pat. No. 4,927,709, inventors Parker et al., which issued on May 22, 1990, and which is incorporated herein by reference.

Label 11 also preferably comprises a waxlike skim coat 19 of the type described above, skim coat 19 being coated directly on top of the entirety of nonwax release layer 17. During label transfer, a small portion of skim coat 19 may be transferred along with the transfer portion of label 11 onto the article being labelled, the amount of skim coat 19 transferred onto the article being labelled not being readily discernible.

Label 11 further comprises a transfer portion 21. Transfer portion 21, in turn, preferably includes a protective lacquer layer 23 printed directly on top of at least a portion of skim coat 19, an ink design layer 25 printed onto a desired area of lacquer layer 23, and a heat-activatable adhesive layer 27 printed onto design layer 25 and any exposed portions of protective lacquer layer 23, as well as being printed onto a surrounding portion of skim coat 19.

As noted above, protective lacquer layer 23 preferably comprises ELVACITE® 2013 acrylic resin (ICI Acrylics Inc., Wilmington, Del.), a low molecular weight methyl/n-butyl methacrylate copolymer having an inherent viscosity of 0.17 (as measured in a solution containing 0.25 g of polymer in 50 ml methylene chloride, measured at 20° C. using a No. 50 Cannon-Fenske Viscometer) and ELVACITE® 2014 acrylic resin (ICI Acrylics Inc., Wilmington, Del.), a medium molecular weight methyl methacrylate copolymer having an inherent viscosity of 0.40 (as measured in the manner described above). The ELVACITE® 2013 and 2014 acrylic resins are present in lacquer layer 23 in an approximately 3 to 2 ratio, respectively, by weight. In addition, lacquer layer 23 includes a strengthening resin, such as nitrocellulose (preferably having a nitrogen content of about 12%), and a release agent, such as UNITHOX™ 750 ethoxylated alcohol (Petrolite Corporation, Tulsa, Okla.), which is described in Petrolite Corporation's Technical Release 4001.0, dated September, 1988, the disclosure of which is incorporated herein by reference.

To form lacquer layer 23, a lacquer composition comprising the components identified above and a suitable volatile solvent system is deposited onto a desired area of skim coat 19, preferably by gravure printing or a similar technique. After deposition of the lacquer composition onto a desired area of skim coat 19, the deposited layer is heated, causing the volatile components thereof to evaporate and leaving only the non-volatile components thereof to make up layer 23.

An example of a preferred lacquer composition for use in forming lacquer layer 23 is the following:

| Component | Percentage by weight |
|---|---|
| ELVACITE ® 2013 acrylic resin | 17.5 |
| ELVACITE ® 2014 acrylic resin | 11.7 |
| nitrocellulose (35% solids in ethyl acetate) | 2.0 |
| castor oil | 0.8 |
| UNITHOX ™ 750 | 8.0 |
| methyl ethyl ketone (MEK) | 60.0 |

Ink design layer 25 of transfer portion 21 preferably comprises one or more polyamide inks and/or acrylic inks of the type conventionally used in the ink design layer of heat-transfer labels. The aforementioned polyamide inks may further include nitrocellulose in the conventional manner. Ink design layer 25 is formed in the conventional manner by depositing, by gravure printing or the like, an ink composition comprising, for example, a polyamide resin (e.g., VERSAMID® 930 or 940 polyamide resin), nitrocellulose, a suitable pigment or dye and one or more suitable volatile solvents onto one or more desired areas of lacquer layer 23. After application of the ink composition onto lacquer layer 23, the deposited layer is heated, causing the volatile solvent component(s) of the ink solvent system to evaporate and leaving only the non-volatile components thereof to form layer 25.

Heat-activatable adhesive layer 27 of transfer portion 21 preferably comprises about 65%, by weight, ELVACITE® 2045 acrylic resin (ICI Acrylics Inc., Wilmington, Del.)—a high molecular weight isobutyl methacrylate resin having an inherent viscosity of 0.64 (as measured in the manner described above). In addition, layer 27 also preferably comprises about 30%, by weight, Eastman Chemical Products, Inc. CP-343-1 chlorinated polypropylene (Kingsport, Tenn.), said CP-343-1 chlorinated polypropylene having a specific gravity, 25°/25≅ C., of 1.025, a Flash point, Tag Closed Cup, of 525° F., a hardness (Tukon), ASTM D 1474, of <1 knoops and a softening range of 175–205° F., said CP-343-1 chlorinated polypropylene being described in Eastman Chemicals Publication No. GN-362, February, 1985, the disclosure of which is incorporated herein by reference. Layer 27 further preferably comprises about 5%, by weight, BENZOFLEX® S-404 glyceryl tribenzoate (Velsicol Chemical Corporation, Chicago, Ill.).

Adhesive layer 27 is formed by depositing by gravure printing or the like onto ink layer 25, as well as onto any exposed portions of lacquer layer 23 and onto a surrounding portion of skim coat 19, an adhesive composition comprising about 17%, by weight, ELVACITE® 2045 acrylic resin, about 8%, by weight, solid (powder) CP-343-1 chlorinated polyolefin, about 1.5%, by weight, BENZOFLEX® S-404 glyceryl tribenzoate and about 73.5% toluene or a similarly suitable volatile organic solvent (e.g., xylene). After application of the adhesive composition onto ink layer 25, the volatile solvent portion of the adhesive composition evaporates, leaving only the non-volatile acrylic resin, chlorinated polyolefin and plasticizer components to form layer 27.

Label 11 is used in the conventional manner by contacting adhesive layer 27 to a desired article while applying sufficient heat to the bottom of carrier web 15 so as to cause transfer portion 21 to be released from support portion 13 and so as to cause adhesive layer 27 to become heat-activated.

The present inventors have noted that, by using label 11 on styrene-acrylonitrile (SAN) surfaces, such as clear SAN beverage tumblers, one can achieve excellent interlayer adhesion (i.e., adhesion between adjacent layers), as well as excellent adhesion between the label and the SAN surface, with the label possessing excellent abrasion resistance, chemical resistance and dishwasher resistance. Moreover, label 11 exhibits good resistance to "pinholing," particularly as compared to the label of U.S. Ser. No. 08/625,013. In addition, due to its use of polyamide and acrylic inks, the present label exhibits high gloss, clarity, and high quality graphics while costing less to produce than certain labels using polyester/vinyl inks. Moreover, the present label has a lower release temperature than many labels having a polyester/vinyl lacquer layer and, therefore, may permit the faster decoration of articles, with higher manufacturing yields.

Figure 2:
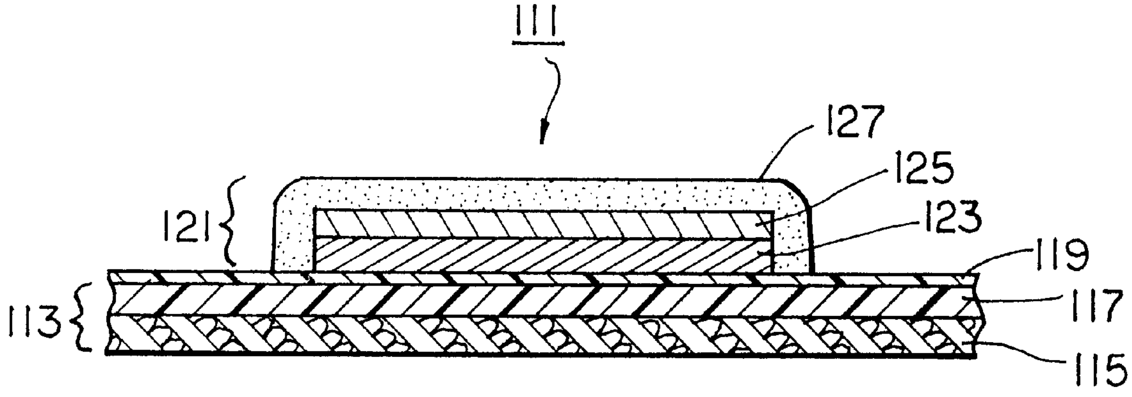
FIG. 2 is a schematic section view of a second embodiment of a heat-transfer label constructed according to the teachings of the present invention, said heat-transfer label being particularly well-suited for use on non-refundable polyethylene terephthalate (PET) containers.

Referring now to FIG. 2, there is shown a schematic section view of a second embodiment of a heat-transfer label constructed according to the teachings of the present invention, said heat-transfer label being particularly well-suited for use on polyethylene terephthalate (PET) surfaces, particularly non-refundable PET containers, said heat-transfer label being represented generally by reference numeral 111.

Label 111 comprises a support portion 113. Support portion 113, in turn, preferably comprises a carrier web 115 and a nonwax release layer 117, carrier web 115 and nonwax release layer 117 being identical to carrier web 15 and nonwax release layer 17, respectively, of label 11.

Label 111 also preferably comprises a waxlike skim coat 119 coated directly on top of the entirety of nonwax release layer 117, skim coat 119 being identical to waxlike skim coat 19 of label 11.

Label 111 further comprises a transfer portion 121. Transfer portion 121, in turn, preferably includes a protective lacquer layer 123 printed directly on top of at least a portion of skim coat 119, an ink design layer 125 printed onto a desired area of lacquer layer 123, and a heat-activatable adhesive layer 127 printed onto design layer 125 and any exposed portions of protective lacquer layer 123, as well as being printed onto a surrounding portion of skim coat 119.

Protective lacquer layer 123 of label 111 is identical to protective lacquer layer 23 of label 11. Ink design layer 125 of label 111 comprises one or more polyamide inks of the type used in ink design layer 25 of label 11.

Heat-activatable adhesive layer 127 of label 111 preferably comprises nitrocellulose and a combination of at least two polyamide resins. Preferably, one of said polyamide resins is a polyamide resin of the type commercially available as VERSAMID 756® polyamide resin, a clear alcohol soluble polyamide resin commercially available from Henkel Corp. (Minneapolis, Minn.), based on dimerized vegetable acid and aliphatic polyamines and having a Brookfield viscosity at 160° C. of 4–7 poise, a softening point of 105–115° C. and a Gardner color (maximum) of 7. Preferably, another of said polyamide resins is a polyamide resin of the type commercially available from Henkel Corp. as VERSAMID 930® polyamide resin, a clear thermoplastic polyamide resin that is soluble in a combination of an alcohol and a hydrocarbon and that is based on dimerized vegetable acid and an aliphatic polyamine. VERSAMID 930® polyamide resin has a Brookfield viscosity at 160° C. of 21–27 poise, a softening point of 105–115° C. and a Gardner color (maximum) of 7. Preferably, nitrocellulose, VERSAMID 756® polyamide resin and VERSAMID 930® polyamide resin are present in said adhesive layer in the following approximate amounts, by weight: 35%, 25% and 40%, respectively.

Adhesive layer 127 is formed by depositing by gravure printing or the like onto ink layer 125, as well as onto any exposed portions of lacquer layer 123 and onto a surrounding portion of skim coat 119, an adhesive composition, such as the following example:

| Component | Percentage by weight |
|---|---|
| VERSAMID ® 930 polyamide resin | 14.3 |
| VERSAMID ® 756 polyamide resin | 9.1 |
| nitrocellulose | 12.5 |
| toluene | 17.3 |
| isopropyl alcohol | 35.9 |
| ethyl acetate | 6.6 |
| n-propyl acetate | 3.4 |
| castor oil | 0.9 |

After application of the adhesive composition onto ink layer 125, the volatile components of the adhesive composition evaporates, leaving only the non-volatile components thereof to form layer 127.

Application of label 111 to non-refundable PET surfaces and the like is preferably performed in the conventional thermal-transfer manner by contacting adhesive layer 127 to the desired article, while applying sufficient heat to the bottom of support portion 113 so as to cause transfer portion 121 (and a portion of skim coat 119) to be released from support portion 113 and so as to cause adhesive layer 127 to become heat-activated for bonding of transfer portion 121 to the desired article. The present inventors have noted that, by using label 111 on non-refundable PET containers, one can achieve excellent interlayer adhesion, as well as excellent adhesion between the label and the PET surface, with the label possessing excellent abrasion resistance, chemical resistance and dishwasher resistance. Moreover, label 111 exhibits good resistance to "pinholing."

The embodiments of the present invention recited herein are intended to be merely exemplary and those skilled in the art will be able to make numerous variations and modifications to it without departing from the spirit of the present invention. For example, to achieve optimal label integrity and optimal adherence between a label and an article, even under conditions of chemical and/or mechanical degradation, one generally seeks to maximize the adhesion between the label and the article and generally seeks to maximize the interlayer adhesion of the various layers of the label. Accordingly, the particular types of materials used in the adhesive, ink and protective lacquer layers may be selected to optimize interlayer adhesion, article adhesion, and/or mechanical and chemical resistance suitable for the intended use of the article. In addition, the types of materials used in the various layers of the label may be selected with an eye towards the particular type of coating and/or printing processes that are to be used in the manufacture of the label. Notwithstanding the above, certain variations and modifications, while producing less than optimal results, may still produce satisfactory results. All such variations and modifications are intended to be within the scope of the present invention as defined by the claims appended hereto.

What is claimed is:

1. A heat-transfer label comprising:

(a) a support portion; and (b) a transfer portion over said support portion for transfer of the transfer portion from the support portion to an article upon application of heat to the support portion while the transfer portion is placed into contact with the article, said transfer portion comprising (i) a protective lacquer layer, said protective lacquer layer comprising nitrocellulose, a release agent and at least one acrylic resin;

(ii) an ink layer over said protective lacquer layer; and (iii) a heat-activatable adhesive layer over said ink layer.

2. The heat-transfer label as claimed in claim 1 wherein said release agent is an ethoxylated alcohol.

3. The heat-transfer label as claimed in claim 1 wherein said at least one acrylic resin is a combination of a low molecular weight methyl/n-butyl methacrylate copolymer and a medium molecular weight methyl methacrylate copolymer.

4. The heat-transfer label as claimed in claim 3 wherein said release agent is an ethoxylated alcohol.

5. The heat-transfer label as claimed in claim 4 wherein said protective lacquer layer comprises about 5%, by weight, nitrocellulose, about 20%, by weight, ethoxylated alcohol, about 45%, by weight, a low molecular weight methyl/n-butyl methacrylate copolymer and 30%, by weight, a medium molecular weight methyl methacrylate copolymer.

6. The heat-transfer label as claimed in claim 5 wherein said ink layer comprises one or more polyamide inks and/or acrylic inks.

7. The heat-transfer label as claimed in claim 6 wherein said heat-transfer label is particularly well-suited for styrene-acrylonitrile surfaces, said heat-activatable adhesive layer comprising an acrylic resin and a chlorinated polyolefin.

8. The heat-transfer label as claimed in claim 7 wherein said acrylic resin is a high molecular weight isobutyl methacrylate resin and wherein said chlorinated polyolefin is a chlorinated polypropylene.

9. The heat-transfer label as claimed in claim 8 wherein said acrylic resin constitutes about 65%, by weight, of said heat-activatable adhesive layer and wherein said chlorinated polyolefin constitutes about 300%, by weight, of said heat-activatable adhesive layer, with the remainder of said heat-activatable adhesive layer being glyceryl tribenzoate.

10. The heat-transfer label as claimed in claim 6 wherein said heat-transfer label is particularly well-suited for polyethylene terephthalate surfaces, said ink layer comprising a polyamide ink, said heat-activatable adhesive layer comprising nitrocellulose and a combination of at least two polyamide resins.

11. The heat-transfer label as claimed in claim 10 wherein a first of said at least two polyamide resins is a clear alcohol soluble polyamide resin based on dimerized vegetable acid and aliphatic polyamines and has a Brookfield viscosity at 160° C. of 4–7 poise, a softening point of 105°115° C. and a Gardner color (maximum) of 7 and wherein a second of said at least two polyamide resins is a clear thermoplastic polyamide resin that is soluble in a combination of an alcohol and a hydrocarbon, that is based on dimerized vegetable acid and an aliphatic polyamine and that has a Brookfield viscosity at 160° C. of 21–27 poise, a softening point of 105–115° C. and a Gardner color (maximum) of 7.

12. The heat-transfer label as claimed in claim 11 wherein nitrocellulose constitutes approximately 35%, by weight, of said heat-activatable adhesive layer, wherein said first of said at least two polyamide resins constitutes approximately 25%, by weight, of said heat-activatable adhesive layer and wherein said second of said at least two polyamide resins constitutes approximately 40%, by weight, of said heat-activatable adhesive layer.

13. A transfer portion of a heat-transfer label that is particularly well-suited for use with styrene-acrylonitrile surfaces, said transfer portion comprising:

(a) a protective lacquer layer, said protective lacquer layer comprising nitrocellulose, a release agent and at least one acrylic resin;

(b) an ink layer over said protective lacquer layer, said ink layer comprising one or more polyamide inks and/or acrylic inks; and (c) a heat-activatable adhesive layer over said ink layer, said heat-activatable adhesive layer comprising an acrylic resin and a chlorinated polyolefin.

14. The transfer portion as claimed in claim 13 wherein said protective lacquer layer comprises nitrocellulose, an ethoxylated alcohol, a low molecular weight methyl/n-butyl methacrylate copolymer and a medium molecular weight methyl methacrylate copolymer.

15. The transfer portion as claimed in claim 14 wherein said protective lacquer layer comprises about 5%, by weight, nitrocellulose, about 20%, by weight, an ethoxylated alcohol, about 45%, by weight, a low molecular weight methyl/n-butyl methacrylate copolymer and about 30%, by weight, a medium molecular weight methyl methacrylate copolymer.

16. The transfer portion as claimed in claim 15 wherein said acrylic resin of said heat-activatable adhesive layer is a high molecular weight isobutyl methacrylate resin and wherein said chlorinated polyolefin is a chlorinated polypropylene.

17. The transfer portion as claimed in claim 16 wherein said acrylic resin constitutes about 65%, by weight, of said heat-activatable adhesive layer and wherein said chlorinated polyolefin constitutes about 30%, by weight, of said heat-activatable adhesive layer, with the remainder of said heat-activatable adhesive layer being glyceryl tribenzoate.

18. A transfer portion of a heat-transfer label that is particularly well-suited for use with polyethylene terephthalate surfaces, said transfer portion comprising:

(a) a protective lacquer layer, said protective lacquer layer comprising nitrocellulose, a release agent and at least one acrylic resin;

(b) an ink layer over said protective lacquer layer, said ink layer comprising one or more polyamide inks; and (c) a heat-activatable adhesive layer over said ink layer, said heat-activatable adhesive layer comprising nitrocellulose and a combination of at least two polyamide resins.

19. The transfer portion as claimed in claim 18 wherein a first of said at least two polyamide resins of said heat-activatable adhesive layer is a clear alcohol soluble polyamide resin based on dimerized vegetable acid and aliphatic polyamines and has a Brookfield viscosity at 160° C. of 4–7 poise, a softening point of 105–115° C. and a Gardner color (maximum) of 7 and wherein a second of said at least two polyamide resins is a clear thermoplastic polyamide resin that is soluble in a combination of an alcohol and a hydrocarbon, that is based on dimerized vegetable acid and an aliphatic polyamine and that has a Brookfield viscosity at 160° C. of 21–27 poise, a softening point of 105–115° C. and a Gardner color (maximum) of 7.

20. The transfer portion as claimed in claim 19 wherein nitrocellulose constitutes approximately 35%, by weight, of said heat-activatable adhesive layer, wherein said first of said at least two polyamide resins constitutes approximately 25%, by weight, of said heat-activatable adhesive layer and wherein said second of said at least two polyamide resins constitutes approximately 40%, by weight, of said heat-activatable adhesive layer.

21. The transfer portion as claimed in claim 20 wherein said protective lacquer layer comprises about 5%, by weight, nitrocellulose, about 20%, by weight, an ethoxylated alcohol, about 45%, by weight, a low molecular weight methyl/n-butyl methacrylate copolymer and about 30%, by weight, a medium molecular weight methyl methacrylate copolymer.

22. A heat-transfer label that is particularly well-suited for polyethylene terephthalate surfaces, said heat-transfer label comprising:

(a) a support portion; and (b) a transfer portion over said support portion for transfer of the transfer portion from the support portion to an article upon application of heat to the support portion while the transfer portion is placed into contact with the article, said transfer portion comprising (i) a protective lacquer layer;

(ii) an ink layer over said protective lacquer layer; and (iii) a heat-activatable adhesive layer over said ink layer, said heat-activatable adhesive layer comprising nitrocellulose and a combination of at least two polyamide resins.

23. The heat-transfer label as claimed in claim 22 wherein a first of said at least two polyamide resins of said heat-activatable adhesive layer is a clear alcohol soluble polyamide resin based on dimerized vegetable acid and aliphatic polyamines and has a Brookfield viscosity at 160° C. of 4–7 poise, a softening point of 105–115° C. and a Gardner color (maximum) of 7 and wherein a second of said at least two polyamide resins is a clear thermoplastic polyamide resin that is soluble in a combination of an alcohol and a hydrocarbon, that is based on dimerized vegetable acid and an aliphatic polyamine and that has a Brookfield viscosity at 160° C. of 21–27 poise, a softening point of 105–115° C. and a Gardner color (maximum) of 7.

24. The transfer portion as claimed in claim 23 wherein nitrocellulose constitutes approximately 35%, by weight, of said heat-activatable adhesive layer, wherein said first of said at least two polyamide resins constitutes approximately 25%, by weight, of said heat-activatable adhesive layer and wherein said second of said at least two polyamide resins constitutes approximately 40%, by weight, of said heat-activatable adhesive layer.

* * * * *